US009917682B2

(12) United States Patent
Zhang et al.

(10) Patent No.: US 9,917,682 B2
(45) Date of Patent: Mar. 13, 2018

(54) METHOD AND A CENTRAL BASE STATION FOR INTERFERENCE MANAGEMENT IN A CELLULAR NETWORK

(75) Inventors: Zhan Zhang, Beijing (CN); Yu Qian, Beijing (CN); Xinghua Song, Beijing (CN); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 519 days.

(21) Appl. No.: 14/362,820

(22) PCT Filed: Dec. 7, 2011

(86) PCT No.: PCT/CN2011/002043
§ 371 (c)(1),
(2), (4) Date: Jun. 4, 2014

(87) PCT Pub. No.: WO2013/082734
PCT Pub. Date: Jun. 13, 2013

(65) Prior Publication Data
US 2014/0341144 A1    Nov. 20, 2014

(51) Int. Cl.
*H04L 5/00* (2006.01)
*H04B 7/024* (2017.01)
(Continued)

(52) U.S. Cl.
CPC .......... *H04L 5/0073* (2013.01); *H04B 7/024* (2013.01); *H04B 7/0617* (2013.01);
(Continued)

(58) Field of Classification Search
CPC ... H04B 7/02; H04B 7/06; H04B 7/08; H04B 7/024; H04B 7/086; H04B 7/0617;
(Continued)

(56) References Cited

U.S. PATENT DOCUMENTS

2007/0149118 A1* 6/2007 Kang .................. H04B 7/2606
455/11.1
2008/0013520 A1* 1/2008 Liu .................... H04B 7/15542
370/347
(Continued)

FOREIGN PATENT DOCUMENTS

CN    101106807 A    1/2008
EP    2 369 757    9/2011
(Continued)

OTHER PUBLICATIONS

PCT International Search Report issued for International Application No. PCT/CN2011/002043, dated Sep. 20, 2012.
(Continued)

*Primary Examiner* — Walter Divito
*Assistant Examiner* — Dharmesh Patel
(74) *Attorney, Agent, or Firm* — Baker Botts, LLP

(57) ABSTRACT

The embodiments relate to a method and a base station (110) for interference management in a cellular network (100) employing Space-Division uplink (UL) downlink (DL) Duplexing (SDD). The base station (110) assigns a plurality of Remote Radio Units (RRU) as Tx RRUs operable to dedicatedly transmit downlink signals to a plurality of UEs and Rx RRUs operable to dedicatedly receive uplink signals from the plurality of UEs at the same frequency band and same time as the transmission of the Tx RRUs. The base station then suppresses the interference caused by simultaneous transmission on the same frequency band by using a Tx spatial beamforming weighting matrix and a Rx spatial beamforming weighting matrix. In addition, the base station may perform cross-talk cancellation on the residual interference contained in the received signals by using the knowledge of the downlink traffic data.

24 Claims, 3 Drawing Sheets

(51) Int. Cl.
*H04B 7/06* (2006.01)
*H04B 7/08* (2006.01)
*H04W 72/04* (2009.01)

(52) U.S. Cl.
CPC ......... *H04B 7/0619* (2013.01); *H04B 7/0626* (2013.01); *H04B 7/086* (2013.01); *H04L 5/006* (2013.01); *H04L 5/0069* (2013.01); *H04W 72/0413* (2013.01)

(58) Field of Classification Search
CPC ....... H04B 7/0619; H04B 7/0626; H04L 5/00; H04L 5/006; H04L 5/0069; H04L 5/0073; H04W 40/02; H04W 72/04; H04W 72/08; H04W 72/0413; H04W 88/08
See application file for complete search history.

(56) References Cited

U.S. PATENT DOCUMENTS

2008/0032632 A1  2/2008  Choi et al.
2011/0199946 A1*  8/2011  Breit .................... H04B 7/0626
                                                              370/310
2011/0243040 A1  10/2011  Khan et al.

FOREIGN PATENT DOCUMENTS

| WO | WO 2009/066899 | 5/2009 |
| WO | WO 2011/018892 | 2/2011 |
| WO | WO 2011/071470 | 6/2011 |
| WO | WO 2011/078750 | 6/2011 |
| WO | WO 2013/004283 | 1/2013 |

OTHER PUBLICATIONS

Extended EP Search for Application No./Patent No. 11877103.9-1852/2749080, PCT/CN2011002043 dated Mar. 5, 2015.
The State Intellectual Property Office of the People's Republic of China—"Notification of the First Office Action", 6 pages; translation 3 pages, dated May 25, 2017.

* cited by examiner

US 9,917,682 B2

METHOD AND A CENTRAL BASE STATION FOR INTERFERENCE MANAGEMENT IN A CELLULAR NETWORK

PRIORITY

This nonprovisional application is a U.S. National Stage Filing under 35 U.S.C. § 371 of International Patent Application Serial No. PCT/CN2011/002043, filed Dec. 7, 2011 and entitled "A Method And A Central Base Station For Interference Management In A Cellular Network."

TECHNICAL FIELD

The technology generally relates to Space-Division uplink (UL) downlink (DL) Duplexing (SDD) in a cellular network, more particularly to a method and a base station for interference management in a cellular network employing SDD.

BACKGROUND

Full-duplex wireless communication may be achieved exploiting the degrees of freedom available in time, frequency or other suitable domains. The two most prevalent duplexing schemes used in wireless communication systems are Frequency Division Duplexing (FDD) and Time Division Duplexing (TDD). In FDD, the downlink (DL) and uplink (UL) transmissions are separated in frequency domain. In TDD, the DL and UL transmissions are separated in time domain.

TDD and FDD have their own disadvantages. For example, in 3G (e.g. WCDMA) or 4G (e.g. LTE) systems in which time-varying asymmetrical traffic of data services is overwhelming, FDD has a lower flexibility in adjusting UL/DL resource allocation for a better overall spectrum efficiency than TDD. Despite the high frequency efficiency gained by flexibly allocating time resource to UL/DL, TDD systems suffer from base station to base station interference due to possible radio propagation delay greater than the guard time of DL/UL switching or inaccurate synchronization.

The use of other independent dimensions to achieve duplexing has become attractive. Space Division Duplexing (SDD) has been proposed to exploit the degrees of freedom in space domain. However, due to the open radio propagation, allocating the same time and frequency resources for DL and UL transmission will cause serious interference. Some interference management methods have been proposed in the prior art. For example, it is discussed in WO2008/008013A1 a method for reducing the interference in an UL cell from nearby DL transmissions. However, the method is aimed to reduce temporary interference occurring in so-called "mixed mode or non-synchronized TDD" scenario in which one cell may receive interference from another nearby cell when the nearby cell temporally adapt the UL time slots to DL time slots. It is not sufficient to manage or reduce the significant and constant interference occurring in a SDD scenario.

SUMMARY

Therefore, it is an object to solve the above-mentioned problems.

According to an aspect of the present embodiments, a method in a central base station for interference management in a cellular network employing Space-Division uplink (UL) downlink (DL) Duplexing (SDD) is provided. The central base station is connected to a plurality of Remote Radio Units (RRU), and each RRU has multiple antennas. The method comprises: assigning the plurality of RRUs as Tx RRUs operable to dedicatedly transmit downlink signals to a plurality of UEs and Rx RRUs operable to dedicatedly receive uplink signals from the plurality of UEs at the same frequency band and same time as the transmission of the Tx RRUs. The assigning may be based on geographic locations and/or loading rate of the plurality of RRUs. The method further comprises, estimating channel status information (CSI) between each Tx RRU and its neighbouring Rx RRUs; selecting at least one Tx RRU as serving Tx RRU for a UE, and selecting at least one Rx RRU as serving Rx RRU for the UE. The method also comprises, receiving an uplink traffic signal from the UE via each serving Rx RRU using a Rx spatial beamforming (BF) weighting matrix to null downlink traffic signals transmitted from the neighbouring Tx RRUs. The Rx spatial BF weighting matrix is determined based on CSI between each serving Rx RRU and the neighbouring Tx RRUs and CSI between the UE and each serving Rx RRU. According to an embodiment, the method further comprises transmitting a downlink traffic signal to the UE via each serving Tx RRU using a Tx spatial BF weighting matrix to null transmission to the neighbouring Rx RRUs. The Tx spatial BF weighting matrix may be determined based on CSI between each serving Tx RRU and the UE and CSI between each serving Tx RRU and the neighbouring Rx RRUs. According to yet an embodiment, the method comprises, generating a synthesized signal by emulating downlink traffic data from the neighbouring Tx RRUs utilizing CSI between the neighbouring Tx RRUs and the at least one serving Rx RRU, Tx spatial BF weighting matrix and Rx spatial BF weighting matrix, and remove the synthesized signal from the signal received via the at least one serving Rx RRU.

The estimating of CSI may comprise broadcasting a first reference signal via each Tx RRU, and estimating CSI between each Tx RRU and its neighbouring Rx RRUs based on the first reference signal received via the neighbouring Rx RRUs. The estimating of CSI may further comprise scheduling the plurality of UEs not to transmit at the same frequency band during the broadcasting of the first reference signal.

The selecting of at least one Tx RRU may comprise transmitting a second reference signal to the UE via each Tx RRU, receiving feedback indicating signal quality measurement of the second reference signal for each Tx RRU from the UE, and selecting the at least one Tx RRU with high signal quality measurement as the serving Tx RRU for the UE. The second reference signal may be transmitted to the UE via each Tx RRU using a first spatial weighting matrix to null transmission to the neighbouring Rx RRUs.

The selecting of at least one Rx RRU may comprise receiving a preamble signal from the specific UE via each Rx RRU, measuring quality of the preamble signal for each Rx RRU, and selecting the at least one Rx RRU with high signal quality as the serving Rx RRU for the UE. Quality of the preamble signal for each Rx RRU may be measured by applying a second spatial weighting matrix to null transmission from the neighbouring Tx RRUs.

The selecting of at least one serving Tx RRU and the selecting of at least one serving Rx RRU may comprise evaluating performance of hypotheses of potential groups of serving Tx RRUs and serving Rx RRUs, and selecting a group with highest performance as the at least one serving Tx RRU and the at least one serving Rx RRU for the UE.

The total number of the at least one serving Rx RRU may be greater than that of the at least one Tx RRU, or the total number of the antennas of the at least one serving Rx RRU for the UE may be greater than that of the at least one serving Tx RRU.

According to another aspect of the present embodiments a central base station in a cellular network employing SDD is provided. The central base station comprises a central controlling unit and an interface for connecting the base station to a plurality of RRUs. The central controlling unit is operable to assign the plurality of RRUs as Tx RRUs operable to dedicatedly transmit downlink signals to a plurality of UEs, and Rx RRUs operable to dedicatedly receive uplink signals from the plurality of UEs at the same frequency band and same time as the transmission of the Tx RRUs. The plurality of RRUs may be assigned based on geographic locations or loading rate of the plurality of RRUs. The central controlling unit is operable to estimate channel status information (CSI) between each Tx RRU and its neighbouring Rx RRUs. The central controlling unit is operable to select at least one Tx RRU as serving Tx RRU for a UE, and select at least one Rx RRU as serving Rx RRU for the UE. The central controlling unit is operable to receive an uplink traffic signal from the UE via each serving Rx RRU using a Rx spatial BF weighting matrix to null downlink traffic signals transmitted from the neighbouring Tx RRUs. The Rx spatial BF weighting matrix is determined based on CSI between each serving Rx RRU and the neighbouring Tx RRUs and CSI between the UE and each serving Rx RRU. The central controlling unit may be further operable to transmit a downlink traffic signal to the UE via each serving Tx RRU using a Tx spatial BF weighting matrix to null transmission to the neighbouring Rx RRUs. The Tx spatial BF weighting matrix may be determined based on CSI between each serving Tx RRU and the UE and CSI between each serving Tx RRU and the neighbouring Rx RRUs. The central controlling unit may be further operable to generate a synthesized signal by emulating the downlink traffic data from the neighbouring Tx RRUs utilizing CSI between the neighbouring Tx RRUs and the at least one serving Rx RRU, Tx spatial BF weighting matrix and Rx spatial BF weighting matrix, and remove the synthesized signal from the signal received via the at least one serving Rx RRU.

An advantage with present embodiments is to manage and reduce interference in a cellular network employing SDD.

BRIEF DESCRIPTION OF THE DRAWINGS

The present disclosure will be described in detail by reference to the following drawings, in which.

DETAILED DESCRIPTION

Figure 1:
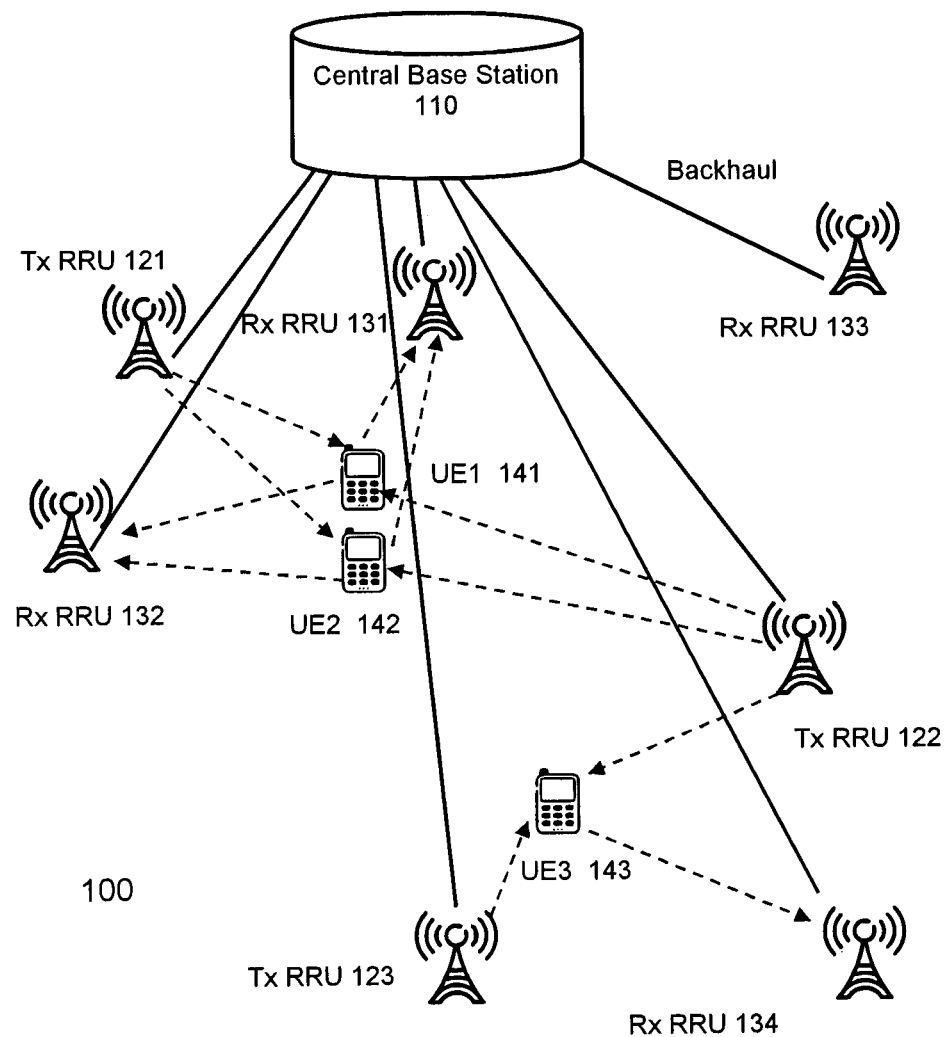
FIG. 1 shows a schematic view of a cellular communication network 100 employing SDD in accordance with an embodiment of the present disclosure.

Embodiments of the present disclosure will be described more fully hereinafter with reference to the accompanying drawings. These embodiments may, however, be embodied in many different forms and should not be construed as limited to the embodiments set forth herein. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present embodiments belong. It will be further understood that terms used herein should be interpreted as having a meaning that is consistent with their meaning in the context of this specification and the relevant art and will not be interpreted in an idealized or overly formal sense unless expressly so defined herein.

The present disclosure is described below with reference to block diagrams and/or flowchart illustrations of methods, apparatus (systems) and/or computer program products according to embodiments of the present disclosure. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present embodiments may be embodied in hardware and/or in software (including firmware, resident software, micro-code, etc.). Furthermore, the present embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Although the present disclosure is described with reference to the Long Term Evolution (LTE)—based communication network in the context, the present embodiments are also application to other types of networks employing RRUs and central radio base stations. Although specific terms in some specifications are used here, such as evolved Node B (eNB), Remote Radio Unit (RRU), it should be understood that the embodiments are not limited to those specific terms but can be applied to all similar entities.

Embodiments of the present disclosure will be described below with reference to the drawings.

In TDD or FDD communication networks, the duplexing between the UL and DL is implemented by time or frequency division mechanism. That is, the UL and DL are allocated with different time slots or frequency band for transmitting data. According to an aspect of the present disclosure, there is described a Space-Division uplink downlink Duplexing (SDD) scheme in a cellular network, in particular, among RRUs geographically distributed in different sites, some are configured to dedicatedly transmit DL data to UEs (Tx RRU), and some are configured to dedicatedly receive UL data from UEs (Rx RRU). The DL transmission occupies the same frequency band and time slots as the UL transmission. Or, the frequency band and time slots allocated for the DL transmission is at least partly overlapped with those allocated for the UL transmission. The degrees of freedom in space domain are thus fully exploited. Various mechanisms are, in accordance with the present embodiments, used to manage or reduce the interference received by the Rx RRUs which caused by the simultaneous DL transmission at the same frequency band from the Tx RRUs.

FIG. 1 shows a schematic view of a cellular communication network 100 employing SDD in accordance with an embodiment of the present disclosure.

As shown in FIG. 1, the network 100 includes a central radio base station e.g. a central eNB 110 and a plurality of RRUs 121-134 which are distributed in different geographical locations within the serving area of the central eNB 110. The network 100 may be a LTE-Advanced communication network. The central eNB 110 may include a central controlling unit (not shown) which implement functions of Base Band processing Units (BBU) or BBU pool and other controlling functions. The central eNB 110 are connected to the RRUs via (high speed) backhaul links. The eNB 110 owns powerful processing capability to process signals from/to the distributed RRUs. Such a centralized architecture may save operating expenditure (OPEX) for operators.

In particular, the RRUs are assigned or divided by the central eNB 110 into two types, i.e. RRUs that dedicatedly transmit signals to UEs (referred to as Tx RRU) and RRUs that dedicatedly receive signals from the UEs (referred to as Rx RRU). The transmission from the Tx RRUs to UE (referred to as DL) and the transmission from the UE to the Rx RRUs (referred to as UL) at least partly occupy the same frequency band and time slots. For example, as shown in FIG. 1, the RRUs 121, 122 and 123 operate as Tx RRUs, and the RRUs 131, 132, 133 and 134 operate as Rx RRUs. The Tx RRUs 121, 122 and 123 may transmit downlink signals to the UE1 141 to UE2 143 at a certain frequency band and time slots. For simplicity, assuming that the UE1 141 to UE2 143 transmit uplink signals to the Rx RRUs 132, 131, 133 and 134 at the same frequency band (i.e. in a co-channel manner) and the same time slots (i.e. simultaneously). Nevertheless, it should be understood that the resource efficiency may be improved even if only part of the resources for UL transmission are overlapped with those allocated for DL transmission.

For simplicity, only the interaction between the UE1 141, UE2 142, Tx RRUs 121, 122 and Rx RRUs 132, 131 will be discussed hereinafter, although the UEs are able to communicate with other RRUs such as 133, 123 and 134. Assume that the UE1 141 and UE2 142 are operating in TDD, the UE1 141 receives downlink signal from the Tx RRUs 121 and 122 at the full available frequency band in time slot #1, and transmits uplink signal to the Rx RRUs 132 and 131 at the full available frequency band in time slot #2. In the traditional TDD network, since the time slots #1 and #2 have been allocated to downlink and uplink transmission of the UE1 141, other UEs have to synchronize their transmission and reception with this downlink and uplink ordering, which means the RRUs only work for certain time slots. However, in the network 100 employing SDD proposed by the present disclosure, the UE2 142 can use time slot #1 to transmit uplink signal to the Rx RRUs 132 and 131 at the full available frequency band, and use time slot #2 to receive downlink signal from the Tx RRUs 121 and 122 at the full available frequency band. That is, from the view of the eNB, the downlink transmission and uplink reception occur simultaneously at the same frequency band. As compared with the conventional TDD network, the potential radio resource utilization efficiency may be increased.

In addition to uplink signals from the UE1 141 and UE2 142, the Rx RRUs 132 and 131 inevitably receive undesired interference which is caused by the signals simultaneously transmitted at the same frequency band from the Tx RRUs 121 and 122. In the above illustrative example that UE1 141 and UE2 142 are operating in TDD, the Rx RRU 132 and 131 will receive in time slot #1 not only the uplink signal from the UE2 142, but the signal transmitted from the Tx RRUs 121 and 122 to the UE1 141 which will generate interference. Similarly, the Rx RRU 132 and 131 will receive in time slot #2 not only the uplink signal from the UE1 141, but the interference caused by signal from the Tx RRUs 121 and 122 to the UE2 142.

It should be understood that the above example is for illustrative purpose only. In practice there are more than two time slots and more Tx RRUs available which can be allocated to more than two UEs. When receiving signals from the UE2 142, the Rx RRU 132 and 131 may receive in time slot #1 interference as caused by downlink transmission intended to other UEs besides UE1 141.

The SDD scheme may also apply to the case that the UEs operate in FDD or the case that some of UEs operate in FDD and others operate in TDD. In an illustrative example that UE1 141 and UE2 142 operate in FDD, the UE1 141 may receive downlink signal from the Tx RRUs 121 and 122 at a first frequency channel in some time slots, and transmit uplink signal to the Rx RRUs 132 and 131 at a second frequency channel in the same time slots. The UE2 142 may use the first frequency channel to transmit uplink signal to the Rx RRUs 132 and 131 at the same time slots, and use the second frequency channel to receive downlink signal from the Tx RRUs 121 and 122 at the same time slots. The Rx RRU 132 and 131 will receive at the first frequency channel not only the uplink signal from the UE2 142, but interference caused by the signal intended to be transmitted from the Tx RRUs 121 and 122 to the UE1 141.

Unlike the "mixed mode TDD" scenario in WO2008/008013A1 which temporarily and passively generates interference, a cellular network employing SDD will actively generate constant interference during normal operating. In the conventional cellular network where each RRU is responsible for both Tx and Rx, it is difficult to implement SDD. But in accordance with the teaching of the present embodiments wherein SDD is considered, when the RRUs are assigned as dedicate Tx and Rx RRUs, the interference conditions will be greatly simplified, and the central base station will be able to obtain the relatively constant channel conditions among Tx RRUs, Rx RRUs and UEs, and perform interference management or reduction methods accordingly. The SDD will thus be feasible.

Some interference management mechanisms are proposed and will be described herein below.

In an embodiment, when assigning the RRUs, the central eNB 110 may consider geographic locations of RRUs. At the stage of cell plan, the operators may arrange the geographic locations of the RRUs to minimize the overall interference level, e.g. by placing RX RRU and TX RRU in maximized distance.

In another embodiment, when assigning the RRUs, the central eNB 110 may consider loading rate of available time-frequency resources of RRUs. Each of the assigned Tx or Rx RRU groups preferably includes both high loading RRUs and low loading RRUs for purpose of loading balance. In addition, the assigning scheme may be periodically updated or dynamically changed, e.g. as the loading rate of RRUs varies. With enough computer power, the central eNB 110 may evaluate different schemes in advance or in real-time and select one with best performance for a specific area.

The central eNB 100 may also consider the system throughput and select one scheme with maximum system throughput. Since the cellular network are gradually dominated by data service which features dynamic asymmetric traffic, the greater the number of Rx RRUs and the number of antennas of Rx RRUs are, the higher overall system throughput is expected. It is advantageous to configure as great number of Rx RRUs and great number of antennas of Rx RRUs as possible. Preferably the total number of Rx RRUs is greater than that of Tx RRUs, and the total number of antennas of Rx RRUs is greater than that of antennas of Tx RRUs.

As discussed above, unlike the "mixed mode TDD" scenario in WO2008/008013A1 which temporarily and passively generates interferences, a cellular network employing SDD will actively generate constant interference during normal operating. The interference will become more significant and complicated as the number of RRUs and UEs in the network increases. By properly assigning the RRUs, the central eNB 110 may reduce from the source the possible interferences to the Rx RRUs.

The central eNB 110 may estimate channel status information (CSI) between each Tx RRU and its neighbouring Rx RRUs. The principle of CSI estimation between a Tx RRU and a Rx RRU is similar to that between a Tx RRU and a UE. For example, the central eNB 110 may broadcast a first reference signal via each Tx RRU, and listen to the first reference signal via the neighbouring Rx RRUs. The CSI between each Tx RRU and its neighbouring Rx RRUs may be estimated based on the first reference signal received via the neighbouring Rx RRUs. We use $H_{ji}$ denoting the CSI from $j^{th}$ Tx RRU to the $i^{th}$ Rx RRU. During the CSI estimation, the central eNB 110 may schedule the UEs not to transmit during the broadcasting of the first reference signal, in order to allow a precise estimation. The central eNB 100 may also switch the role of RRUs during the CSI estimation to facilitate the estimation. The CSI may be collected and updated by the central eNB 110 periodically.

Once the roles of all the RRUs are determined, the central eNB may select for a UE that have accessed the network, e.g. UE1 141, one or more serving Tx RRUs for downlink transmission and one or more serving Rx RRUs for uplink reception, and allocate time and frequency resources to the UE1 141. As shown in FIG. 1, among the three Tx RRUs 121, 122 and 123, the central eNB 110 selects two serving Tx RRUs 121 and 122 for the UE1 141; and among the four Rx RRUs 131, 132, 133 and 134, the central eNB 110 selects two serving Rx RRUs 131 and 132 for the UE1 141 (the radio links between serving RRUs and UEs are depicted by dashed arrows). The similar rule for assigning the RRUs can be applied for selecting the serving Tx and Rx RRUs, i.e. minimize the interference to neighboring Rx RRUs. The geographic locations and loading rate of RRUs may be taken into consideration. More serving RRUs can be selected if the loading rate are low. The central eNB 110 may pre-store a configuration of serving Tx and Rx RRUs for a specific UE and apply the configuration at the time of selecting serving RRUs, in order to simplify and speed up the selection.

Another rule for selecting the serving Tx and Rx RRUs is to maximize the DL and UL signal quality for the UE. For example, the central eNB 110 may broadcast a second reference signal $x_j$ to the UE (UE1 141) via each Tx RRU. Here j indexes all the Tx RRUs (121, 122 and 123). In addition, the second reference signal may be weighted by spatial weighting matrix $Z_j$ to null the transmission to the neighbouring RX RRUs of each Tx RRU. In other words, the second reference signal transmitted from different antennas at the TX RRU are weighted by scaling the signal in different magnitudes and shifting it with different phases, and the scaling and phase-shifting values are determined in order to make the RX RRUs in the neighborhood of the TX RRUs receive a minimized power of second reference signal. For example, the Rx RRUs 132, 131 and 133 may be considered as neighbors of the Tx RRU 121. The Rx RRU 134 is shown placed at a considerable distance from the Tx RRU 121. The weighted second reference signal vector comprising second reference signals transmitted from each Tx RRU, is given by $$\hat{x}_j = Z_j x_j$$

where $Z_j = (I - \bar{U}_j^H (\bar{U}_j \bar{U}_j^H)^{-1} \bar{U}_j)$ and $\bar{U}_j$ is a matrix consisting of one or several most significant row Eigen vectors of $U_j$, obtained by Eigen analysis $R_j = U_j^H S_j U_j$ where $$R_j = E\left(\sum_b H_{jb}^H H_{jb}\right).$$

Here b indexes the neighboring Rx RRUs of the $j^{th}$ Tx RRU, and the summation is carried out on all the neighboring Rx RRUs. E is a statistical mean operation, and I is a unit matrix.

The UE1 141 receives the second reference signals broadcasted from each Tx RRU. The second reference signals from different TX RRUs are different each other and can be identified by the UE1 141 based on their known characteristics (such as sequence values). The UE1 141 then reports to the eNB 110 feedback information which indicates signal quality measurement of the second reference signal for each Tx RRU. The signal quality may be indicated, e.g. by signal power $\|\hat{x}_j\|$. The central eNB 110 receives the feedback information from the UE1 141, and configures at least one Tx RRUs with high signal quality measurement, e.g. Tx RRUs 121 and 122 as the serving Tx RRUs for the UE1 141. The procedure may last for a certain time period and the central eNB 110 may select the Tx RRU the second reference signal from which keeps being of high quality during that period as the serving Tx RRU. Owing to the mobility of the UE, the serving TX RRU could vary from time to time.

The central eNB 110 informs the UE1 141 of the selected serving Tx RRU, After that, the UE1 141 may periodically or aperiodically report the link quality estimated from measurements of the second reference signals from the serving TX RRU. This link quality information will assist the decision making at the central eNB 110 about the radio frequency-time resource scheduling to the UE1 141 for its DL traffic data transmission service.

As compared with the conventional method in determining the serving communication nodes which usually deploys an omni directional or coverage-oriented broadcasting, the present disclosure manages and reduces the interference caused during selecting serving Tx RRUs by applying spatial weighting to the second reference signal. Similarly, spatial weighting may be applied during selecting serving Rx RRUs. The central eNB 110 may receive a preamble signal $r_{ki}$ from the UE1 141 via each Rx RRU (131, 132, 133 and 134), and measure quality of the preamble signal for each Rx RRU. Here k represents indexes the UEs, and i indexes all the Rx RRUs. In addition, the preamble signal may be weighted by a spatial weighting matrix $B_i$ null transmission from the neighbouring Tx RRUs. In other words, the central eNB 110 may weights the UE's preamble signal received from different antennas at the RX RRU by scaling the preamble signal in different magnitudes and shifting it with different phases and integrating the scaled and shifted signals. The scaling and phase-shifting values are determined in order to make the RX RRUs in the neighborhood of the TX RRUs receive a minimized power. The weighted preamble signal is given by $$\hat{r}_{ki} = B_i r_{ki}$$

where $B_i = (I - \vec{D}_i (\vec{D}_i^H \vec{D}_i)^{-1} \vec{D}_i^H)$ and $\vec{D}_i$ is a matrix consisting of one or several most significant column Eigen vectors of $D_i$ via Eigen analysis, $$F_i = D_i T_i D_i^H \cdot F_i = E\left(\sum_m H_{mi} H_{mi}^H\right)$$

captures inference statistics caused by neighboring Tx RRUs to the $i^{th}$ Rx RRU. Here m indexes the neighbouring Tx RRUs of the $i^{th}$ Rx RRU. The central eNB 110 configures at least one Rx RRU with high signal quality of the preamble signal, e.g. RRUs 132 and 131, as the serving Rx RRUs for the UE1 141. The signal quality may be indicated, e.g. by signal power $\|\hat{r}_{ki}\|$.

By applying spatial weighting to the preamble signal, the interference caused during selecting serving Rx RRUs will be reduced.

During the traffic communication, the following schemes are proposed to reduce the interference as generated by the Tx RRUs. For simplicity, the UE is assumed to have only one antenna. However, it should be understood that the principle concept of these schemes can be applied to a UE with multiple antennas as well.

In an embodiment, when transmitting a downlink traffic signal to the UE (e.g. UE1 141), via each serving Tx RRU (e.g. Tx RRU 121 and 122), the central eNB 110 may use a Tx spatial beamforming (BF) weighting matrix to null transmission to the neighbouring Rx RRUs of the serving Tx RRU (e.g. Rx RRU 131, 132 and 133 for the serving Tx RRU 121). The Tx spatial BF weighting matrix may be determined based on CSI between each serving Tx RRU and the specific UE and CSI between each serving Tx RRU and the neighbouring Rx RRUs.

The CSI estimation process between the Tx RRUs and Rx RRUs has been described above.

The Tx spatial BF weighting matrix is denoted by $\hat{W}_{jk}$. There are various methods to design a Tx spatial BF weighting matrix for a multiple-antenna transmitter to null or substantially null the transmission to some specific directions.

For example, one method for determining $\hat{W}_{jk}$ is to use the following formula or any simplified version by substituting certain items by a heuristic value(s) or variable(s) but functions with the similar physical meaning or omitting any item(s) in the denominator:

$$\hat{W}_{jk} = \arg\max_{\|W_{jk}\|=1}\left(\det\left(\frac{P_{jk}^{\frac{1}{2}} W_{jk}^H H_{jk}^H H_{jk} W_{jk} P_{jk}^{\frac{1}{2}}}{2\sigma_n^2 + P_{jk}^{\frac{1}{2}} W_{jk}^H \left(\sum_{\bar{k}} H_{j\bar{k}}^H H_{j\bar{k}} + \sum_b H_{jb}^H H_{jb}\right) W_{jk} P_{jk}^{\frac{1}{2}}}\right)\right)$$

where Tx is from $j^{th}$ serving Tx RRU to $k^{th}$ UE as a DL Tx, $P_{jk}$ is the power distribution diagonal matrix for power share of $j^{th}$ serving Tx RRU on the Tx to $k^{th}$ UE, $\bar{k}$ indexes UEs interfered, b indexes neighbouring RX RRU of the $j^{th}$ serving Tx RRU. $\sigma_n^2$ is the noise power. This formula realizes a principle that both of the leakage power to the neighbouring RX RRUs and (non-serving) interfered UEs are suppressed while the signal to the intended UE is beamformed. $^{det}$represents the determinant.

Another method to determining $\hat{W}_{jk}$ is to use the following formula:

$$\hat{W}_{jk} = Z_j \hat{G}_{jk}$$

where $$\hat{G}_{jk} = \arg\max_{\|G_{jk}\|=1}\left(\det\left(\frac{P_{jk}^{\frac{1}{2}} G_{jk}^H Z_j^H H_{jk}^H H_{jk} Z_j G_{jk} P_{jk}^{\frac{1}{2}}}{2\sigma_n^2 + P_{jk}^{\frac{1}{2}} G_{jk}^H Z_j^H \left(\sum_{\bar{k}} H_{j\bar{k}}^H H_{j\bar{k}}\right) Z_j G_{jk} P_{jk}^{\frac{1}{2}}}\right)\right)$$

The nulling algorithm may be in either form of joint RRU multiple-antenna nulling or individual RRU multiple antenna nulling, depending on the consideration of complexity control. The transmit power $P_{jk}$ can be adjusted to further enhance the interference management.

By nulling the signals to be transmitted towards the neighboring Rx RRUs, the interference to the serving Rx RRUs 132 and 131 of the UE1 141 as well as to other neighboring Rx RRUs as caused by the downlink transmission of the serving Tx RRUs 121 and 122 will be suppressed.

In an embodiment, when receiving an uplink traffic signal from the (specific) UE (e.g. UE1 141), via each serving Rx RRU (e.g. Rx RRU 132 and 131), the eNB 110 may use a Rx spatial BF weighting matrix to null downlink traffic signals transmitted from the neighbouring Tx RRUs (e.g. Tx RRUs 121, 122 and 123 for the serving Rx RRU 132) to other UEs (e.g. UE2 142 and UE2 143). The Rx spatial BF weighting matrix may be determined based on CSI between each serving Rx RRU and the neighbouring Tx RRUs and CSI between the specific UE and each serving Rx RRU.

The CSI estimation process between the Tx RRUs and Rx RRUs has been described above.

The Rx spatial BF weighting matrix is denoted by $\hat{V}_{ki}$. There are various methods to design a Rx spatial BF weighting matrix for a multiple-antenna receiver to null or substantially null the transmission from some specific directions.

For example, one method to determine $\hat{V}_{ki}$ is to use following formula or any simplified version by substituting a certain item by a heuristic value or variable but functions in the similar physical meaning or omitting any item(s) in the denominator:

$$\hat{V}_{ki} = \arg\max_{\|V_{ki}\|=1}\left(\det\left(I + \frac{P_k H_{ki}^H V_{ki}^H V_{ki} H_{ki}}{2\sigma_n^2(\sum_{\bar{k}} P_{\bar{k}} H_{\bar{k}i}^H V_{ki}^H V_{ki} H_{\bar{k}i} + \sum_{m,n} P_{mn}^{\frac{1}{2}} \hat{W}_{mn}^H H_{mi}^H V_{ki}^H V_{ki} H_{mi} \hat{W}_{mn} P_{mn}^{\frac{1}{2}})}\right)\right)$$

where k indexes UEs served by the $i^{th}$ serving Rx RRU, m indexes neighboring Tx RRUs, and n indexes interfering UEs. This formula implements the principle of maximizing the ratio of receiving signal of $k^{th}$ UE at $i^{th}$ serving Rx RRU to interference from neighboring Tx RRU(s) and interfering UEs plus noise.

Another method to determine $\hat{V}_{ki}$ is to use following formula or any simplified version by substituting a certain item by a heuristic value or variable but functions in the similar physical meaning or omitting any item(s) in the denominator:

$$\hat{V}_{ki} = \hat{Q}_{ki} B_i$$

$$\hat{Q}_{ki} = \arg\max_{\|Q_{ki}\|=1}\left(\det\left(I + \frac{P_k H_{ki}^H B_i^H Q_{ki}^H Q_{ki} B_i H_{ki}}{2\sigma_n^2 + \sum_{\bar{k}} P_{\bar{k}} H_{\bar{k}i}^H B_i^H Q_{ki}^H Q_{ki} B_i H_{\bar{k}i}}\right)\right)$$

The nulling algorithm can be in either form of joint RRU multiple-antenna nulling or individual RRU multiple antenna nulling, depending on the consideration of complexity control.

By nulling the downlink traffic signals transmitted from the neighbouring Tx RRUs to other UEs, the interference to the serving Rx RRUs 131 and 132 of the UE1 141 as caused by the downlink transmission of the Tx RRUs will be further suppressed.

The serving Rx RRUs (e.g. RRUs 131 and 132) of the UE (e.g. UE1 141) may receive some residual interference caused by downlink traffic signal from the neighboring Tx RRUs to other UEs (e.g. UE2 142 and UE2 143), in addition to the useful uplink traffic signal from the UE1 141. Thanks to the centralized architecture, the central eNB 110 is aware of the downlink traffic data which is transmitted, from the neighboring Tx RRUs to UE2 142 and UE2 143. Thus the eNB 110 may perform "cross-talk" cancellation on the residual interference contained in the received signals by using the knowledge of the downlink traffic data.

The central eNB 110 may generate a synthesized signal by emulating the downlink traffic data from the neighbouring Tx RRUs utilizing CSI between the neighbouring Tx RRUs and the at least one serving Rx RRU, the Tx spatial BF weighting matrix and the Rx spatial BF weighting matrix. With these kinds of information, the central eNB 110 emulates the whole propagation path that the downlink traffic data originating from a neighbouring Tx RRU goes though and arrives at the serving Rx RRUs as an interference. More specifically, the path emulation constructs an equivalent channel by multiplying the path gains at each sub-path sequentially i.e. Tx BF weighting matrix, channel gain between Tx and Rx RRU(s) obtained from CSI, and Rx BF weighting matrix. Thus, the central eNB 110 estimates the interference by using the known transmitted data passing through the emulated propagation path, i.e. multiplying the equivalent channel with the known transmitted data.

For example, the eNB may generate a synthesized signal $\alpha_{ki}$, by using the following formula or any simplified version by substituting a certain item by a heuristic value or variable but functions in the similar physical meaning or omitting any item(s):

$$\alpha_{ki} = \frac{1}{\sqrt{2}} \sum_{m,n} \hat{V}_{ki} H_{mi} \hat{W}_{mn} P_{mn}^{\frac{1}{2}} s_{mn}$$

where the summation is carried out over neighbouring Tx RRUs which interfere the $i^{th}$ serving Rx RRU, $s_{mn}$ is the downlink traffic data from $m^{th}$ TX RRU to $n^{th}$ UE.

The eNB 110 may remove the synthesized signal $\alpha_{ki}$ from the signal received via the $i^{th}$ serving Rx RRU (denoted as $Y_{ki}$). This cancels the interference caused by the co-channel $m^{th}$ Tx RRU while transmitting to $n^{th}$ UE. Received signal at $i^{th}$ serving Rx RRU $Y_{ki}$ is modelled as $$Y_{ki} = \frac{1}{\sqrt{2}} \hat{V}_{ki} H_{ki} P_k^{\frac{1}{2}} s_k +$$
$$\frac{1}{\sqrt{2}} \sum_{\bar{k}} P_{\bar{k}}^{\frac{1}{2}} \hat{V}_{ki} H_{\bar{k}i} s_{\bar{k}} + \frac{1}{\sqrt{2}} \sum_{m,n} \hat{V}_{ki} H_{mi} \hat{W}_{mn} P_{mn}^{\frac{1}{2}} s_{mn} + N$$

where N is the noise item to represent received noise, $s_k$ is the $k^{th}$ UE's UL traffic data and $P_k$ is the Tx power.

The removing is given by $$\hat{Y}_{ik} = Y_{ik} - \alpha_{ki}$$

or any simplified version by substituting a certain item by a heuristic value or variable but functions in the similar physical meaning or omitting any item(s), $\hat{Y}_{ik}$ is used for detection processing of the symbol $s_k$, which has the following modelling $$\hat{Y}_{ik} = \frac{1}{\sqrt{2}} \hat{V}_{ki} H_{ki} P_k^{\frac{1}{2}} s_k + \frac{1}{\sqrt{2}} \sum_{\bar{k}} P_{\bar{k}}^{\frac{1}{2}} \hat{V}_{ki} H_{\bar{k}i} s_{\bar{k}} + N.$$

It should be noted that the aforementioned algorithm and formulas are just examples to realize the proposed method and this does not exclude any other algorithms with a similar principle to implement the proposed method. It should also be noted that the above schemes of managing interference can be applied individually or in combination. For example, consider a simplex architecture or implementation solution in heterogeneous cellular network. The DL TX will be carried out by macro eNB RRUs while the UL are taken by pico-cell eNB RRUs. In addition, the number of Macro-RRU is very limited in certain area. If the Pico-cell eNB RRU can well null-form the macro-RRU interference by their multiple-antenna and/or the signal cancellation from the backhaul. The macro-cell eNB RRU may just work as conventional RRU without the DL null-forming to pico-cell RRUs.

In the above mentioned interference management methods, the Tx RRUs or Rx RRUs may be grouped to work as one joint Tx RRU or Rx RRU. The number of RRUs in the group may vary according to the processing complexity. The larger number, the higher complexity is required. The central eNB 110 may evaluate performance of hypotheses of potentially groups of serving Tx RRUs and serving Rx RRUs, and select a group with highest performance as the at least one serving Tx RRU and the at least one serving Rx RRU for the UE.

Figure 2:
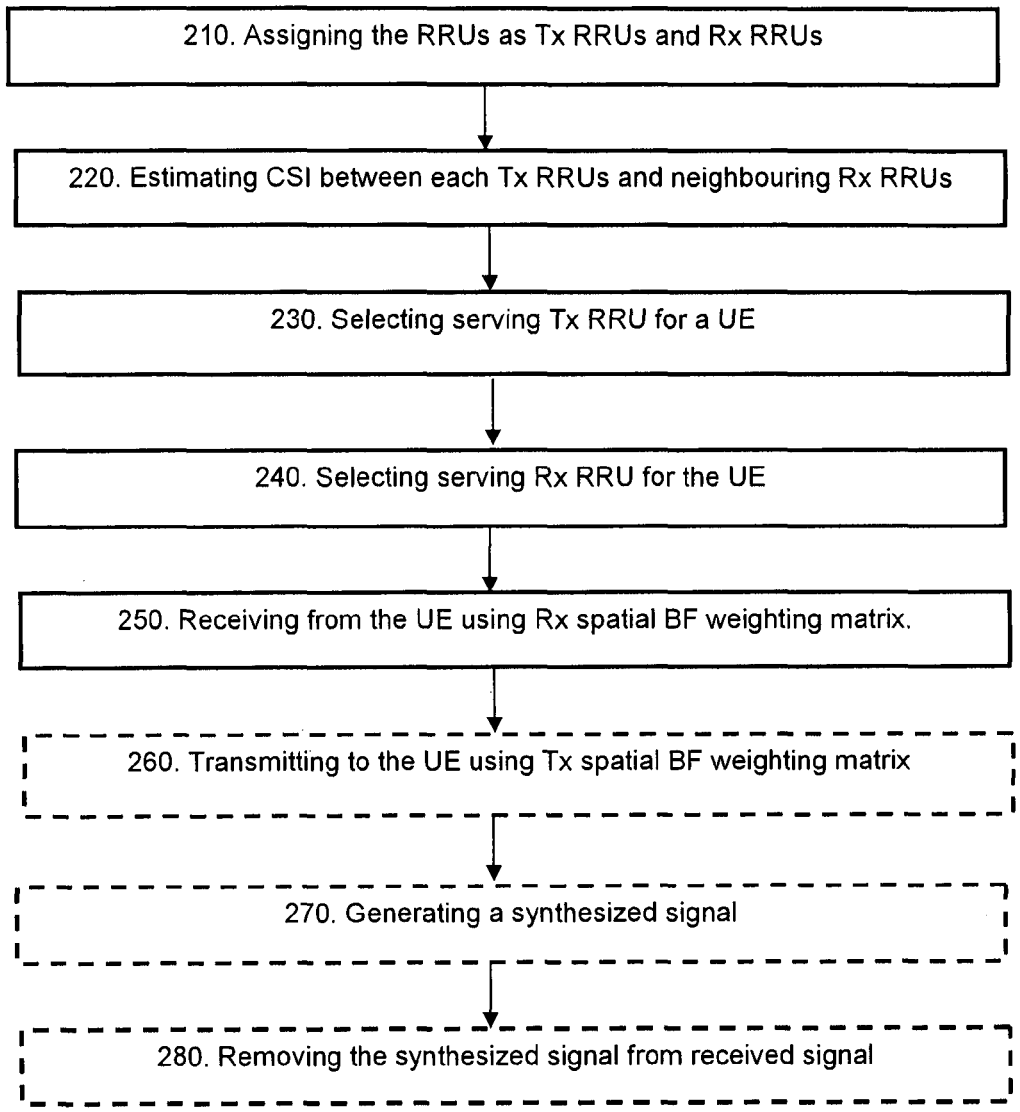
FIG. 2 shows a flowchart of a method in the central base station 110 for interference management in accordance with an embodiment of the present disclosure.

FIG. 2 shows a flowchart of a method in the central base station 110 for interference cancellation in accordance with previously described embodiments of the present disclosure.

As shown, the main steps performed by the central base station comprise:

(210) assigning the plurality of RRUs as Tx RRUs operable to dedicatedly transmit downlink signals to a plurality of UEs and Rx RRUs operable to dedicatedly receive uplink signals from the plurality of UEs at the same frequency band and same time as the transmission of the Tx RRUs. The assigning may be based on geographic locations or loading rate of the plurality of RRUs.

(220) estimating channel status information (CSI) between each Tx RRU and its neighbouring Rx RRUs.

(230) selecting at least one Tx RRU as serving Tx RRU for a UE.

(240) selecting at least one Rx RRU as serving Rx RRU for the UE.

(250) receiving an uplink traffic signal from the UE via each serving Rx RRU using a Rx spatial BF weighting matrix to null downlink traffic signals transmitted from the neighbouring Tx RRUs. The Rx spatial BF weighting matrix is determined based on CSI between each serving Rx RRU and the neighbouring Tx RRUs and CSI between the UE and each serving Rx RRU.

According to an embodiment the central base station 110 may further transmit at step 260 (dashed in FIG. 2) a downlink traffic signal to the UE via each serving Tx RRU using a Tx spatial BF weighting matrix to null transmission to the neighbouring Rx RRUs. The Tx spatial BF weighting matrix may be determined based on CSI between each serving Tx RRU and the UE and CSI between each serving Tx RRU and the neighbouring Rx RRUs. According to an embodiment, the central base station 110 may further generate at step 270 (dashed in FIG. 2) a synthesized signal by emulating the downlink traffic data from the neighbouring Tx RRUs utilizing CSI between the neighbouring Tx RRUs and the at least one serving Rx RRU, Tx spatial BF weighting matrix and Rx spatial BF weighting matrix, and remove at step 280 the synthesized signal from the signal received via the at least one serving Rx RRU.

According to an embodiment, the step 220 of estimating CSI comprises broadcasting a first reference signal via each Tx RRU, and estimating CSI between each Tx RRU and its neighbouring Rx RRUs based on the first reference signal received via the neighbouring Rx RRUs. The step 220 of estimating CSI may further comprise scheduling the plurality of UEs not to transmit at the same frequency band during the broadcasting of the first reference signal.

The step 230 of selecting at least one Tx RRU may comprise transmitting a second reference signal to the UE via each Tx RRU, receiving feedback indicating signal quality measurement of the second reference signal for each Tx RRU from the UE, and selecting the at least one Tx RRU with high signal quality measurement as the serving Tx RRU for the UE. The second reference signal may be transmitted to the UE via each Tx RRU using a first spatial weighting matrix to null transmission to the neighbouring Rx RRUs.

The step 240 of selecting at least one Rx RRU may comprise receiving a preamble signal from the specific UE via each Rx RRU, measuring quality of the preamble signal for each Rx RRU, and selecting the at least one Rx RRU with high signal quality as the serving Rx RRU for the UE. Quality of the preamble signal for each Rx RRU may be measured by applying a second spatial weighting matrix to null transmission from the neighbouring Tx RRUs.

The step 230 of selecting at least one serving Tx RRU and the step 240 of selecting at least one serving Rx RRU may comprise evaluating performance of hypotheses of potential groups of serving Tx RRUs and serving Rx RRUs, and selecting a group with highest performance as the at least one serving Tx RRU and the at least one serving Rx RRU for the UE. The total number of the at least one serving Rx RRU may be greater than that of the at least one Tx RRU, or the total number of the antennas of the at least one serving Rx. RRU for the UE may be greater than that of the at least one serving Tx RRU.

Figure 3:
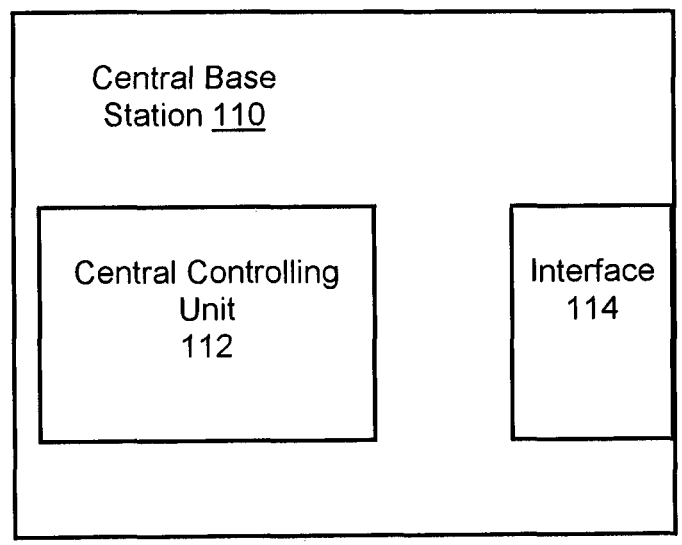
FIG. 3 shows a block diagram of a central base station 110 in the cellular network 100 employing SDD in accordance with an embodiment of the present disclosure.

FIG. 3 shows a block diagram of a exemplary central base station 110 in the cellular network 100 employing SDD in accordance with the present embodiments.

The central base station 110 comprises a central controlling unit 112. The central base station 110 further comprises an interface 114 for connecting the base station 110 to a plurality of RRUs. The central controlling unit 112 is operable to assign the plurality of RRUs as Tx RRUs operable to dedicatedly transmit downlink signals to a plurality of UEs and Rx RRUs operable to dedicatedly receive uplink signals from the plurality of UEs at the same frequency band and same time as the transmission of the Tx RRUs. The plurality of RRUs may be assigned based on geographic locations or loading rate of the plurality of RRUs. The central controlling unit 112 is operable to estimate channel status information (CSI) between each Tx RRU and its neighbouring Rx RRUs. The central controlling unit 112 is operable to select at least one Tx RRU as serving Tx RRU for a UE, and select at least one Rx RRU as serving Rx RRU for the UE. The central controlling unit 112 is operable to receive an uplink traffic signal from the UE via each serving Rx RRU using a Rx spatial BF weighting matrix to null downlink traffic signals transmitted from the neighbouring Tx RRUs. The Rx spatial BF weighting matrix is determined based on CSI between each serving Rx RRU and the neighbouring Tx RRUs and CSI between the UE and each serving Rx RRU. The central controlling unit 112 may be further operable to transmit a downlink traffic signal to the UE via each serving Tx RRU using a Tx spatial BF weighting matrix to null transmission to the neighbouring Rx RRUs. The Tx spatial BF weighting matrix may be determined based on CSI between each serving Tx RRU and the UE and CSI between each serving Tx RRU and the neighbouring Rx RRUs. The central controlling unit 112 may be further operable to generate a synthesized signal by emulating the downlink traffic data from the neighbouring Tx RRUs utilizing CSI between the neighbouring Tx RRUs and the at least one serving Rx RRU, Tx spatial BF weighting matrix and Rx spatial BF weighting matrix, and remove the synthesized signal from the signal received via the at least one serving Rx RRU.

The central controlling unit 112 may be operable to broadcast a first reference signal via each Tx RRU, and estimate CSI between each Tx RRU and its neighbouring Rx RRUs based on the first reference signal received via the neighbouring Rx RRUs.

The central controlling unit 112 may be operable to transmit a second reference signal to the UE via each Tx RRU, receive feedback indicating signal quality measurement of the second reference signal for each Tx RRU from the UE, and select the at least one Tx RRU with high signal quality measurement as the serving Tx RRU for the UE. The second reference signal may be transmitted to the UE via each Tx RRU using a first spatial weighting matrix to null transmission to the neighbouring Rx RRUs.

The central controlling unit 112 may be operable to receive a preamble signal from the UE via each Rx RRU, measure quality of the preamble signal for each Rx RRU, and select the at least one Rx RRU with high signal quality as the serving Rx RRU for the UE. Quality of the preamble signal for each Rx RRU may be measured by applying a second spatial weighting matrix to null transmission from the neighbouring Tx RRUs.

The central controlling unit 112 may be further operable to evaluate performance of hypotheses of potential groups of serving Tx RRUs and serving Rx RRUs and select a group with highest performance as the at least one serving Tx RRU and the at least one serving Rx RRU for the UE.

In the network employing spatial uplink downlink duplexing, all the resources are flexibly scheduled by the central eNB. The UEs simply use the time and frequency resources as allocated by the central eNB to transmit and receive signals, thus the conventional TDD or FDD UEs may still work without the need to be modified. More flexibility and efficiency in resource scheduling may be achieved if the UEs are able to operate in the full available bandwidth. The proposed SDD scheme is described with reference to the scenario of Coordinated MultiplePoint transmission (CoMP), and may be regarded as an enhancement of CoMP. However, the SDD scheme may be also applied to the scenario of single point transmission where one UE is served by only one Tx RRU and one Rx RRU. Cell-plan and further refinement may make the SDD to be feasible in sense of cost control.

While the preferred embodiments have been illustrated and described, it will be understood that various changes and modifications may be made, and equivalents may be substituted for elements thereof without departing from the true scope of the present disclosure. In addition, many modifications may be made to adapt to a particular situation and the teaching herein without departing from its central scope. Therefore it is intended that the presently described embodiments not be limited to the particular embodiments disclosed as the best mode contemplated for carrying out the described embodiments, but that the present invention include all embodiments falling within the scope of the appended claims.

The invention claimed is:

1. A method, in a central base station, for interference management in a cellular network employing Space-Division uplink, UL, downlink, DL, Duplexing, SDD, the central base station being connected to a plurality of Remote Radio Units, RRU, each RRU having multiple antennas, the method comprising:
    assigning each RRU of the plurality of RRUs as either a transmitting, Tx, RRU operable to dedicatedly transmit downlink signals to a plurality of User Equipments, UEs, or a receiving, Rx, RRU operable to dedicatedly receive uplink signals from the plurality of UEs at the same frequency band and same time as the transmission of the Tx RRUs;
    estimating channel status information, CSI, between each Tx RRU and its neighbouring Rx RRUs;
    selecting at least one Tx RRU as serving Tx RRU for a UE;
    selecting at least one Rx RRU as serving Rx RRU for the UE; and
    receiving an uplink traffic signal from the UE via each serving Rx RRU using a Rx spatial beamforming, BF, weighting matrix to null downlink traffic signals transmitted from the neighbouring Tx RRUs, wherein the Rx spatial BF weighting matrix is determined based on CSI between each serving Rx RRU and the neighbouring Tx RRUs and CSI between the UE and each serving Rx RRU.

2. The method of claim 1, further comprising:
    transmitting a downlink traffic signal to the UE via each serving Tx RRU using a Tx spatial BF weighting matrix to null transmission to the neighbouring Rx RRUs, wherein the Tx spatial BF weighting matrix is determined based on CSI between each serving Tx RRU and the UE and CSI between each serving Tx RRU and the neighbouring Rx RRUs.

3. The method of claim 2, further comprising:
    generating a synthesized signal by emulating downlink traffic data from the neighbouring Tx RRUs utilizing CSI between the neighbouring Tx RRUs and the at least one serving Rx RRU, Tx spatial BF weighting matrix and Rx spatial BF weighting matrix; and
    removing the synthesized signal from the signal received via the at least one serving Rx RRU.

4. The method of claim 1, wherein said estimating CSI comprises:
    broadcasting a first reference signal via each Tx RRU;
    receiving the first reference signal via the neighbouring Rx RRUs; and
    estimating CSI between each Tx RRU and its neighbouring Rx RRUs based on the first reference signal received via the neighbouring Rx RRUs.

5. The method of claim 4, wherein said estimating CSI further comprises:
    scheduling the plurality of UEs not to transmit at the same frequency band during the broadcasting of the first reference signal.

6. The method of claim 1, wherein said selecting at least one Tx RRU comprises:
    transmitting a second reference signal to the UE via each Tx RRU;
    receiving feedback indicating signal quality measurement of the second reference signal for each Tx RRU from the UE; and
    selecting the at least one Tx RRU with high signal quality measurement as the serving Tx RRU for the UE.

7. The method of claim 6, wherein said transmitting the second reference signal comprises transmitting the second reference signal to the UE via each Tx RRU using a first spatial weighting matrix to null transmission to the neighbouring Rx RRUs.

8. The method of claim 1, wherein said selecting at least one Rx RRU comprises:
    receiving a preamble signal from the UE via each Rx RRU;
    measuring quality of the preamble signal for each Rx RRU; and
    selecting the at least one Rx RRU with high signal quality as the serving Rx RRU for the UE.

9. The method of claim 8, wherein said measuring comprises measuring quality of the preamble signal for each Rx RRU by applying a second spatial weighting matrix to null transmission from the neighbouring Tx RRUs.

10. The method of claim 1, wherein said assigning comprises assigning the plurality of RRUs based on geographic location or loading rate of the plurality of RRUs.

11. The method of claim 1, wherein said selecting at least one serving Tx RRU and said selecting at least one serving Rx RRU comprise:
   evaluating performance of hypotheses of potential groups of serving Tx RRUs and serving Rx RRUs; and
   selecting a group with highest performance as the at least one serving Tx RRU and the at least one serving Rx RRU for the UE.

12. The method of claim 1, wherein the total number of the at least one serving Rx RRU is greater than that of the at least one Tx RRU, or the total number of the antennas of the at least one serving Rx RRU for the UE is greater than that of the at least one serving Tx RRU.

13. A central base station in a cellular network employing Space-Division uplink, UL, downlink, DL, Duplexing, SDD, the central base station comprising:
   an interface operable to connect the central base station to a plurality of Remote Radio Units, RRU, each RRU having multiple antennas;
   a central controlling unit operable to:
      assign each of the plurality of RRUs as either a transmitting, Tx, RRU operable to dedicatedly transmit downlink signals to a plurality of User Equipments (UE) or a receiving, Rx, RRU operable to dedicatedly receive uplink signals from the plurality of UEs at the same frequency band and same time as the transmission of the Tx RRUs;
      estimate channel status information, CSI, between each Tx RRU and its neighbouring Rx RRUs;
      select at least one Tx RRU as serving Tx RRU for a UE;
      select at least one Rx RRU as serving Rx RRU for the UE; and
      receive an uplink traffic signal from the UE via each serving Rx RRU using a Rx spatial beamforming, BF, weighting matrix to null downlink traffic signals transmitted from the neighbouring Tx RRUs to other UEs, wherein the Rx spatial BF weighting matrix is determined based on CSI between each serving Rx RRU and the neighbouring Tx RRUs and CSI between the UE and each serving Rx RRU.

14. The central base station of claim 13, wherein the central controlling unit is further operable to:
   transmit a downlink traffic signal to the UE via each serving Tx RRU using a Tx spatial BF weighting matrix to null transmission to the neighbouring Rx RRUs, wherein the Tx spatial BF weighting matrix is determined based on CSI between each serving Tx RRU and the UE and CSI between each serving Tx RRU and the neighbouring Rx RRUs.

15. The central base station of claim 14, wherein the central controlling unit is further operable to:
   generate a synthesized signal by emulating the downlink traffic data from the neighbouring Tx RRUs utilizing CSI between the neighbouring Tx RRUs and the at least one serving Rx RRU, Tx spatial BF weighting matrix and Rx spatial BF weighting matrix; and
   remove the synthesized signal from the signal received via the at least one serving Rx RRU.

16. The central base station of claim 13, the central controlling unit is further operable to:
   broadcast a first reference signal via each Tx RRU;
   receive the first reference signal via the neighbouring Rx RRUs; and
   estimate CSI between each Tx RRU and its neighbouring Rx RRUs based on the first reference signal received via the neighbouring Rx RRUs.

17. The method of claim 16, wherein the central controlling unit is further operable to:
   schedule the plurality of UEs not to transmit at the same frequency band during the broadcasting of the first reference signal.

18. The central base station of claim 13, wherein the central controlling unit is further operable to:
   transmit a second reference signal to the UE via each Tx RRU;
   receive feedback indicating signal quality measurement of the second reference signal for each Tx RRU from the UE; and
   select the at least one Tx RRU with high signal quality measurement as the serving Tx RRU for the UE.

19. The central base station of claim 18, wherein the central controlling unit is further operable to transmit the second reference signal to the UE via each Tx RRU using a first spatial weighting matrix to null transmission to the neighbouring Rx RRUs.

20. The central base station of claim 13, wherein the central controlling unit is further operable to:
   receive a preamble signal from the UE via each Rx RRU;
   measure quality of the preamble signal for each Rx RRU; and
   select the at least one Rx RRU with high signal quality as the serving Rx RRU for the UE.

21. The central base station of claim 20, wherein the central controlling unit is further operable to measure quality of the preamble signal for each Rx RRU by applying a second spatial weighting matrix to null transmission from the neighbouring Tx RRUs.

22. The central base station of claim 13, wherein the central controlling unit is further operable to assign the plurality of RRUs based on geographic location or loading rate of the plurality of RRUs.

23. The central base station of claim 13, wherein the central controlling unit is further operable to:
   evaluate performance of hypotheses of potential groups of serving Tx RRUs and serving Rx RRUs; and
   select a group with highest performance as the at least one serving Tx RRU and the at least one serving Rx RRU for the UE.

24. The central base station of claim 13, wherein the total number of the at least one serving Rx RRU is greater than that of the at least one Tx RRU, or the total number of the antennas of the at least one serving Rx RRU for the UE is greater than that of the at least one serving Tx RRU.

* * * * *